United States Patent Office 3,508,742
Patented Apr. 28, 1970

3,508,742
METHOD AND APPARATUS FOR MELTING
GLASSY MATERIALS BY A ROTARY KILN
Susumu Minegishi, 729 Higashiterao-cho, Tsurumi-ku,
Yokohama-shi, Kanagawa, Japan
Filed Apr. 9, 1968, Ser. No. 719,984
Claims priority, application Japan, Aug. 14, 1967,
42/51,778
Int. Cl. F27b 7/02
U.S. Cl. 263—32                                    9 Claims

ABSTRACT OF THE DISCLOSURE

A method and an apparatus for melting glassy materials by using a ring-grate shaped rotary kiln lined with corrosion resistant refractories. Said rotary kiln is heated to high temperature sufficient to keep a fluidity of the glassy raw materials which are preheated so as not to make them a sticky state through a preheating kiln, and melted at the inlet end of said rotary kiln.

BRIEF SUMMARY OF THE INVENTION

This invention relates to a high-efficient method of and an apparatus for melting glassy materials to manufacture glassy substances by using a melting rotary kiln interconnected with a pre-heating kiln.

The glassy substances comprise, besides general glasses; molten products of high polymers, for example, phosphates; vitreous silica; feldspar; pyroxene; basalt; wollastonite, mineral ore and those mixtures, having a similar softening and melting character.

An object of this invention is to provide a method of manufacturing high quality glassy substances at high heat efficiency and low cost.

Another object of this invention is to provide a method of melting glassy materials by a simple apparatus.

Further objects of this invention is to provide an apparatus attaining these objects.

These and still further objects as shall hereinafter appear are fulfilled by the present invention in a manner easily discerned from the following detailed description when read in conjunction with the accompanying drawings.

BRIEF DESCRIPTION OF THE SEVERAL VIEWS OF THE DRAWINGS

In the accompanying drawings which illustrate one embodiment of the invention.

BACKGROUND OF THE INVENTION

Figure 1:
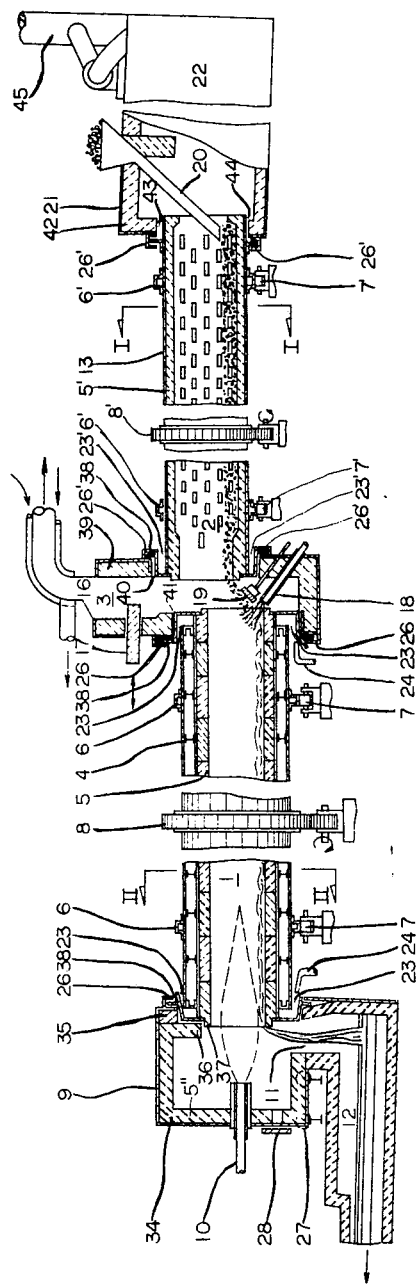
FIG. 1 is a side elevation section of the plant embodying the present invention.

In contemporary manufacturing process of glassy substances, pot or tank furnaces have been used for melting the glassy materials. Generally speaking, those furnaces are not satisfactory in its poor heat efficiency and also in its high construction costs.

To obviate these disadvantages, various attempts to melt the glassy materials by a rotary kiln, has been tried, but those schemes have not been successful. The reason is assumed as follows:

(1) When the glassy materials are heated, the glassy materials change its state from soft to viscous according to its temperature and lastly it becomes flowable state. So if it is attempted to melt the glassy materials in a single rotary kiln, the glassy materials become sticky to adhere inner periphery of the kiln and a glassy ring—i.e. pasty dam—is formed to grow up generally far from the discharge end of the kiln. As it is difficult to clear away the grown high dam, the combustion of the fuel is lastly suspended.

(2) As the inner lining refractories are heavily corroded by the molten glassy substances, long time kiln operation becomes impossible.

DETAILED DESCRIPTION OF THE INVENTION

To obviate aforementioned defect, this invention uses a melting rotary kiln and a preheating kiln, and before the glassy materials tumble down into the inlet end of the melting rotary kiln, the glassy materials are preheated firstly by the preheating kiln so as not make a sticky state and secondary heated to melt in a flowable state at the inlet end of the melting rotary kiln, which was heated over the melting point of the glassy substances.

In order to bear the melting rotary kiln in longer life, the corrosion resistant refractories, such as electrocast refractories, should be used for the inner lining and the outer surface of the refractories should be cooled by natural or forced air to form a corrosion resistant zone between a molten glassy phase and refractories.

With reference to FIG. 1–FIG. 7 of the drawings, a rotary kiln 1 melting the glassy materials and a kiln 2 preheating them, incline slightly downwardly from a feeder housing 21 to a burner hood 9, respectively, to assist the translation of the materials therethrough. The structure of kiln 1 is very specific and characteristics of this invention. The kiln 1 comprises a ring-grate shaped cylindrical shell 4 having an internal lining 5 formed of suitable solid refractories. The kind of refractories is changed subjected to the kind of glassy materials, for example, for borosilicate glass zirconia-electrocast refractories is suitable and for barium glass high aluminum refractories is suitable. The signification of the cylindrical shell 4 will hereinafter be more fully explained. A plurality of riding rings 6 (only two rings is shown in the drawing) are disposed circumferentially about the cylindrical shell 4 and are supported on suitable carrying rollers 7. Suitable driving means are provided such, for example, as driving ring gear 8, motor (not shown) and the like.

The kiln 2 comprises a tubular shell 13 having an internal lining 5' of suitable refractories.

Figure 2:
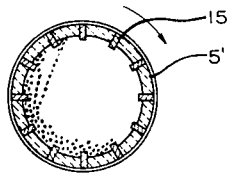
FIG. 2 is sectional view taken along line I—I of FIG. 1 with other details of the kiln being omitted for clarity.

As shown in FIG. 2, it is preferable to provide the projected abrasion resistant offset bricks 15 for the purpose of mixing and preheating the glassy materials. A plurality of riding rings 6' are disposed circumferentially about the tubular shell 13 and supported on suitable carrying roller 7' and drive means are provided as the case of the kiln 1.

The preheated glassy materials tumbled from the discharge end of the kiln 2 are translated to the inlet end of the kiln 1 by the conveyor 19. The conveyor 19 is composed of a heat and abrasion resistant refractory and supported by a heat resistant metal connecting vibrator 46 (only partially end portion is shown) (see FIG. 6).

Adjacent the discharge end of the kiln 1, burner hood 9 comprises a housing 34 having a lining of a suitable refractory 5″. Hood 9 contains a conventional burner 10 by which the mixture of fuel and air is fed into rotary kiln 1. The firing hood 9 is provided with a suitable means such, for example, as roller 27 to permit the axial expansion and conjunction of the kiln simply in response to the application of the heat. The hood housing 34 includes a front wall 35 having defined therein an annular opening 36 which is adjusted in dimension to define annulus 37 with the shell 4. The portion of the hood front wall 35 is provided with a collar member 26 extending outwardly from the housing 34 toward the shell 4 having a radially extending flange 38 circumferentially disposed thereupon presenting a bearing surface toward the shell 4. A discharge vent 11 is provided at the discharge end of the kiln 1 to drop therethrough the molten glassy substances from the kiln to a withdrawal furnace 12. A peep hole 28 is bored the lower position of the burner 10. Therethrough the operator watches and inspects the molten glassy substances.

Figure 6:
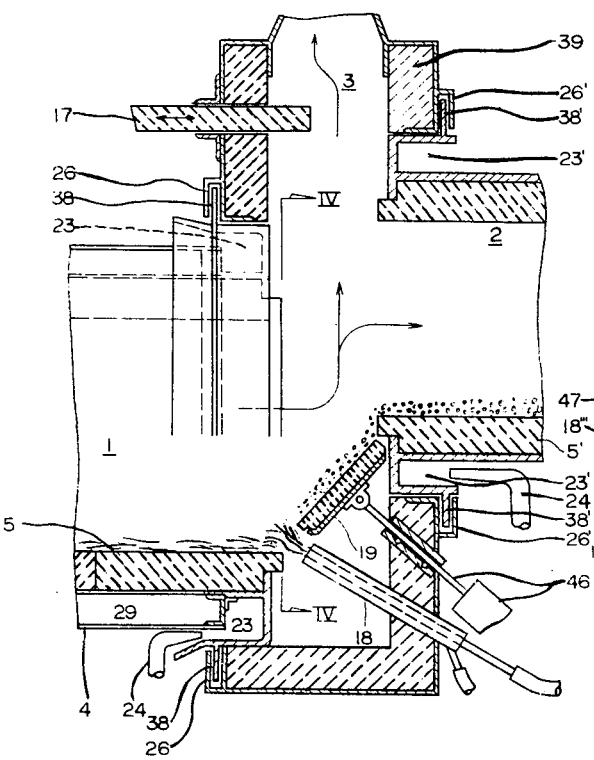
FIG. 6 is an enlarged fragmental sectional view showing of a portion of an interconnecting hood.
Figure 7:
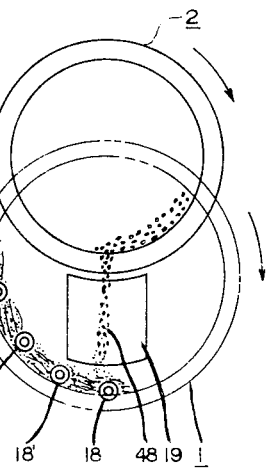
FIG. 7 in an enlarged fragmental sectional view taken along line IV—IV of FIG. 6.

A hood 3 interconnected between the another end of the kiln 1 and the discharge end of the kiln 2 comprises a housing 39 and a exhaust gas passage 16 having a lining of a suitable refractories. The hood housing 39 includes a front and back wall having defined therein annular opening 40, 41. The portion of the front and back wall is similarly defined to that of the front wall 35 described hereinbefore. The exhaust gas passage 16 connects to a heat exchanger 22 and a control damper 17 is put between them to regulate the volume distribution of the exhaust gas so as not to make the preheated glassy materials a sticky state. The hood 3 contains the aforesaid conveyor 19 and a conventional burners 18. In this invention, special attention is paid to the arrangement of the burners 18. As shown in FIGS. 6 and 7, the burners are located from the lower part of the inlet end in series along its direction of the rotation in order to heat the glassy materials as soon as possible. In FIG. 7 numerical order 47 and 48 show a flowable state and a falling state of the preheated glassy materials.

At the feeder end of the kiln 2, a chute 20 is interconnected with the kiln chamber and supported within a housing 21 which has a front wall 42 defined an opening 43 therein. The opening 43 is provided for the telescopic arrangement of the kiln 2 within the housing 21 as shown and preferably corresponds generally to the shape of the tubular shell 13. The gas exhausted from the kiln 2 passes through the heat exchanger 22 and exhaust from the stack 45 to the atmosphere.

The collar member 26, 26′ and the flange 38, 38′ are a simple example of means sealing air and permitting axial expansion and contraction of the kilns in response to the application of the heat. The dimension difference between the opening 36, 41 and the shell 4, and between the opening 40, 43 and the shell 13 defines an annulus which permits slight distortion and expansion or contraction of the shell, attendant operation to occur without binding the housing and the kiln.

At the both ends of the kiln 1 and one end of the kiln 2, cooling jacket 23 and 23′ are provided in circumscribing relationship to the shell 1 and 2, and the cooling air is blown therein by the nozzles 24 and 24′, respectively. The use of a cooling jacket helps to dissipate some of the heat from the end of the kilns to overcome to a certain extent the serious distortion and expansion otherwise resulting from the action of the heat on the metal shell.

Figure 3:
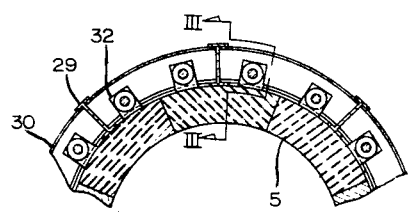
FIG. 3 is a sectional view taken along line II—II of FIG. 1.
Figure 4:
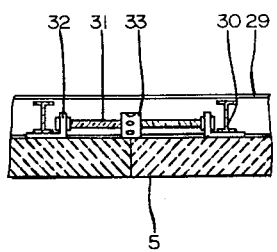
FIG. 4 and FIG. 5 are a side sectional view taken along line III—III and a plan view of FIG. 3, respectively.
Figure 5:
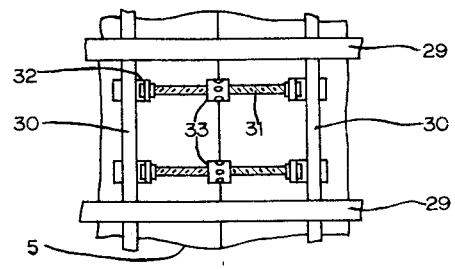

As particularly shown in FIGS. 3, 4 and 5, the kiln 1 comprises a ring-grate shaped cylindrical shell 4 having an internal lining 5 of a suitable solid refractories, and the offset shape refractories are used at both ends of the kiln to obviate the contact of molten glassy substances from the metal frame and aforesaid vent. The outside of the refractories is exposed in atmosphere to cool them naturally as shown in FIG. 5. The ring-grate shape cylindrical shell 4 is formed of plural I-beam 29 which are arranged axially at regular intervals, and plural I-beam or channel rings 30 which are welded at right angle to the beam 29. The refractories are tightened with wedges 32 inserted between I-beam 30 and the refractories 5. The wedges 32 transfer from side to side by rotating the reverse screwed bolt 31 with the nut 33.

Figures 8, 9:
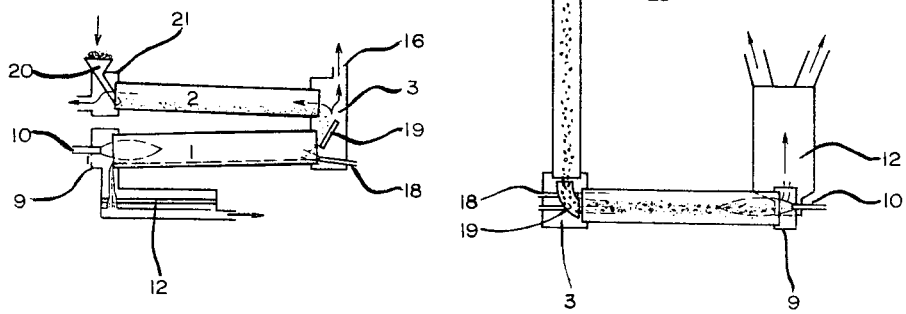
FIG. 8, FIG. 9 and FIG. 10 are other examples of an embodiment of the present invention.
Figure 10:
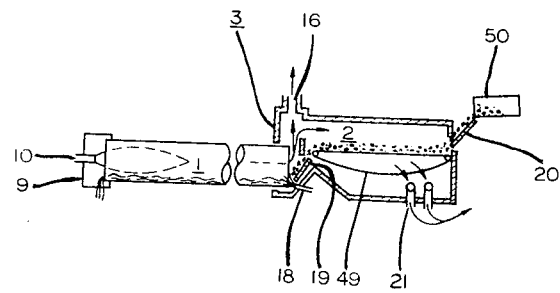

FIG. 8 and FIG. 9 show typical examples of an application of this invention. In these case, two kilns laid out vertically and rectangularly, respectively. FIG. 10 shows a diagrammatical view of this invention laid out a grate conveyor as a preheat kiln. Numerical order 50 and 49 show a granulator and a preheat grate conveyor, repectively.

Figure 11:
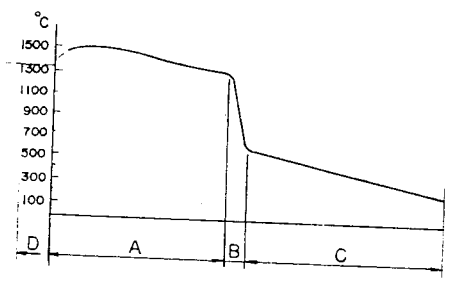
FIG. 11 is an operation temperature diagram in the present invention.
Figure 12:
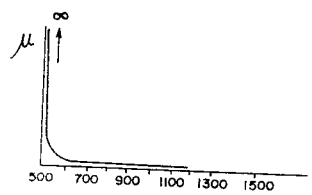
FIG. 12 is a viscosity-temperature curve for glass.

The operation of the plant as shown in FIG. 1 is as follows:

The melting rotary kiln 1, the preheat kiln 2 and the vibratory transmitting conveyor 19 are started to drive, and the mixture of fuel and air is fed to fire the kiln 1 by the burners 10 and 18. After the temperature of the kiln 1 and 2 rose to normal conditions, the glassy materials are put in the kiln 2 through the chute 20, and the opening of the damper 17 is regulated to preheat the raw materials so as not to make them a sticky state. The preheated glassy materials tumbled down from the kiln 2, are carried away with the conveyor 19 to the inlet end of the kiln 1 and are melted into flowable state by the burner 18 and fed into the kiln 1. The molten glassy substances flow continuously spirally inside of the kiln 1 and is discharged to the withdrawal furnace 12 through the discharge vent 11. The condition of the operation temperature of the plant is shown in FIG. 11. In FIG. 11, A, B, C and D correspond to a part of the melting rotary kiln 1, the interconnecting hood 3, the preheat kiln 2 and the withdrawal furnace 12, respectively. FIG. 12 shows the viscosity ($\mu$) of glass as a function of its temperature in degrees centigrade.

In this invention, full combustion of the fuel is indispensable in order to avoid the contamination of carbon particle into the molten glassy substances which will deteriorate the quality of product by coloring and staining. Therefore, in the practice of this invention it is desirable to use preheat air or enriched air by a few percent of oxygen and sometimes the augment flame burner boosted electric power is effectively appreciable for burning in the kiln 1.

The advantage of this invention is as follows:
(1) Higher efficiency of heat and productivity,
(2) Longer life of the kiln,
(3) Lower manufacturing cost,
(4) Higher quality in its uniformity and purity is obtainable. In this invention, the raw materials and the molten glassy substances are mixed powerfully by steady rotating action of the kiln, so that bubble or blisters in the molten glassy substances can be easily got out, and cords or striae are scattered and disappeared.
(5) As the glassy materials are mixed powerfully in the preheat rotary kiln, a conventional mixer becomes useless. Moreover it is possible to charge the glassy materials simultaneously in the preheat rotary kiln end.
(6) High temperature is obtainable and hard-soften ore can be melted.
(7) The installation cost is less expensive compared with ordinary pot or tank furnace due to the unnecessity of the building above the rotary kiln.
(8) Operation and maintenance of this plant is easier. For example, in heating the glassy materials into normal temperature, it takes only several hours instead of 20–30 days in ordinally used glass tank furnace.
(9) The quality control of the product and temperature regulation of the plant is more easy.
(10) The change of the kinds of glassy materials is more easy than conventional furnace.

Without limiting this invention, the following example is given to illustrate my preferred mode of operation.

EXAMPLE

The glassy materials are sand 100 parts, dolomite 27 parts, soda ash 39 parts, oxidizing agent 1 part by weight respectively. Adding these batch 50% cullet and 2% water spray to prevent scattering of them, they are charged into the plant and melted to produce the glassy substance at the following conditions:

The size of the melting rotary kiln—1.04$\phi$ x 8 m., inclined 3%
The size of the preheat rotary kiln—1.2$\phi$ x 7 m., inclined 3.5%
The glassy materials charging—2.7 t./hr.
The temperature of the glassy materials at the lower end of the kiln 2—510° C.
The semi-melted glass temperature at the inlet end of the melting kiln 1 (op.)—1280° C.
The inner periphery of the kiln 1 and glass temperature under the burner 10 (op.)—1470° C.

2.2 t./hr. molten glass of high quality product was obtained. The following is analysis of the product.

| | |
|---|---|
| $SiO_2$ | 70.5 |
| $Al_2O_3 + Fe_2O_3$ | 2 |
| $CaO + MgO$ | 10 |
| $Na_2O + K_2O$ | 16 |
| Others | 1 |

The above invention has been described in reference to melting the glassy materials, such description necessarily contains limitation which in no way should be construed as limitation to the inventive concept contained herein except as defined and limited in the appended claims.

What is claimed is:

1. A method of melting glassy materials in an inclined rotary kiln comprising:
    (a) conveying said materials through a preheating kiln,
    (b) preheating said materials during the passage through said kiln just sufficiently so that they do not form a sticky mass, and then
    (c) heating said preheated glassy materials between said preheating kiln and said rotary kiln so that they are melted as they pass into said rotary kiln, and
    (d) further heating said materials in said rotary kiln to a temperature sufficient to further melt and refine said materials.

2. The method as in claim 1 and further including the step of agitating said materials by rotary motion of said preheating kiln as they are conveyed through said preheating kiln.

3. The method as in claim 1, wherein said materials are conveyed by a grate conveyer through said preheating kiln.

4. The method as in claim 1, wherein the glassy materials are heated from 100 to 600° C., in the preheating kiln and then heated from 1200 to 1600° C. in said rotary kiln.

5. Apparatus comprising in combination an inclined melting rotary kiln, a preheating kiln and an interconnecting hood, the discharge end and inlet end of said rotary kiln being arranged telescopically in the burner hood and said interconnecting hood, respectively, the discharge end and inlet end of said preheating kiln being arranged telescopically in said interconnecting hood and a housing in which a charging chute of the glassy materials is supported, and said interconnecting hood comprising means conveying the preheated raw materials tumbled from said preheating kiln into said rotary kiln, means melting the preheated materials at the inlet end of said rotary kiln and a control damper which distributes the high temperature exhaust gas from said rotary kiln and said heating means to said preheating kiln and a heat-exchange chamber.

6. An apparatus as claimed in claim 5, in which a cylindrical structure lined with solid corrosion resistant refractories around inside of a ring-grate shaped structure is employed for the rotary kiln.

7. An apparatus as claimed in claim 6, in which the offset shape refractories are used at both ends of the cylindrical structure.

8. An apparatus as claimed in claim 5, in which a rotary kiln is employed for the preheating kiln.

9. An apparatus as claimed in claim 5, in which a grate conveyor is employed for the preheating kiln.

References Cited

UNITED STATES PATENTS

| | | | |
|---|---|---|---|
| 1,366,398 | 1/1921 | Lund | 263—325 |
| 2,229,383 | 1/1941 | Lohse | 263—32 X |
| 2,505,249 | 4/1950 | Johnson et al. | 263—32 X |
| 2,636,723 | 4/1953 | Harter et al. | 263—27 X |
| 3,313,534 | 4/1967 | Frans | 263—32 |

JOHN J. CAMBY, Primary Examiner

U.S. Cl. X.R.

263—53